United States Patent
Buttrick, Jr.

(10) Patent No.: US 7,264,426 B2
(45) Date of Patent: Sep. 4, 2007

(54) APPARATUS AND METHODS FOR SERVO-CONTROLLED MANUFACTURING OPERATIONS

(75) Inventor: James N. Buttrick, Jr., Seattle, WA (US)

(73) Assignee: The Boeing Company, Chicago, IL (US)

( * ) Notice: Subject to any disclaimer, the term of this patent is extended or adjusted under 35 U.S.C. 154(b) by 279 days.

(21) Appl. No.: 10/606,402

(22) Filed: Jun. 25, 2003

(65) Prior Publication Data

US 2004/0265081 A1  Dec. 30, 2004

(51) Int. Cl.
*B23B 47/00* (2006.01)

(52) U.S. Cl. .......................... 408/1 R; 408/9; 408/76; 408/102; 409/132; 409/178

(58) Field of Classification Search .................. 408/9, 408/76, 102, 56, 57, 97, 1 R; 409/131, 132, 409/175, 178

See application file for complete search history.

(56) References Cited

U.S. PATENT DOCUMENTS

| | | | |
|---|---|---|---|
| 1,676,206 A | 7/1928 | Ratliff | |
| 1,741,044 A | 12/1929 | Whipple et al. | |
| 2,151,205 A * | 3/1939 | Hawn | 408/56 |
| RE21,795 E * | 5/1941 | Verderber | 269/58 |
| 2,360,942 A * | 10/1944 | Ellerstein | 408/112 |
| 2,911,860 A | 11/1959 | Winslow et al. | |
| 2,922,323 A * | 1/1960 | Weidner | 408/17 |
| 2,946,246 A * | 7/1960 | Allan | 408/76 |
| 2,963,927 A | 12/1960 | Hanger | |
| 3,348,248 A * | 10/1967 | Milkert | 408/1 R |
| 3,456,738 A | 7/1969 | Harry | |
| 3,575,364 A | 4/1971 | Frederick | |
| 3,592,095 A | 7/1971 | Passa et al. | |
| 3,599,958 A | 8/1971 | Schindler | |
| 3,627,436 A | 12/1971 | Adams et al. | |
| 3,633,433 A | 1/1972 | Schurch | |
| 3,663,115 A | 5/1972 | Vindez et al. | |
| 3,732,608 A | 5/1973 | Knopf | |
| 3,874,244 A | 4/1975 | Rasmussen et al. | |
| 3,935,985 A | 2/1976 | Prudhomme et al. | |
| 3,990,689 A | 11/1976 | Eklund, Sr. | |
| 4,025,218 A * | 5/1977 | Logan et al. | 408/11 |

(Continued)

FOREIGN PATENT DOCUMENTS

DE  19834702 A1  2/2000

(Continued)

*Primary Examiner*—Monica Carter
*Assistant Examiner*—Michael W. Talbot
(74) *Attorney, Agent, or Firm*—Lee & Hayes, PLLC (57) ABSTRACT

Apparatus and methods for servo-controlled manufacturing operations are disclosed. In one embodiment, an apparatus includes a base member, a drive platform spaced apart from the base member by a separation distance, and a plurality of guide members extending between the drive platform and the base member. At least one of the drive platform and the base member are moveable along the guide members to increase or decrease the separation distance. The apparatus also includes a drive member operatively coupled between the drive platform and the base member, and a servo motor operatively coupled to the drive member. As the servo motor drives the drive member, the separation distance is varied. In an alternate embodiment, a manufacturing tool may be coupled to at least one of the drive platform and the base member.

27 Claims, 3 Drawing Sheets

U.S. PATENT DOCUMENTS

| | | | |
|---|---|---|---|
| 4,031,931 A * | 6/1977 | Balcombe | 144/83 |
| 4,091,712 A | 5/1978 | Geiger | |
| 4,123,187 A * | 10/1978 | Turner | 408/17 |
| 4,149,822 A | 4/1979 | Lehmkuhl | |
| 4,179,231 A * | 12/1979 | Hadden | 408/112 |
| 4,268,949 A | 5/1981 | Sato | |
| 4,353,308 A | 10/1982 | Brown | |
| 4,388,890 A | 6/1983 | Wester et al. | |
| 4,396,318 A | 8/1983 | Jensen et al. | |
| 4,468,159 A | 8/1984 | Oster | |
| 4,561,814 A | 12/1985 | Dahlgren, Jr. et al. | |
| 4,570,542 A | 2/1986 | Cable et al. | |
| 4,591,301 A | 5/1986 | Pelfrey | |
| 4,599,018 A * | 7/1986 | Woods | 408/1 R |
| 4,686,397 A * | 8/1987 | Becker | 310/36 |
| 4,720,897 A * | 1/1988 | Orrell et al. | 29/26 A |
| 4,740,117 A | 4/1988 | Schaff Deleury et al. | |
| D297,144 S | 8/1988 | Kazlauskas | |
| 4,761,876 A | 8/1988 | Kosmowski | |
| 4,778,317 A | 10/1988 | Earle, III et al. | |
| 4,787,786 A | 11/1988 | Freud et al. | |
| 4,818,154 A * | 4/1989 | Bye et al. | 408/111 |
| 4,850,763 A | 7/1989 | Jack et al. | |
| 4,932,814 A * | 6/1990 | York | 408/1 R |
| 4,958,967 A * | 9/1990 | Adachi | 409/185 |
| 5,032,051 A | 7/1991 | Gilmore | |
| 5,062,746 A | 11/1991 | Deremo | |
| 5,070,792 A | 12/1991 | Harris | |
| 5,072,948 A * | 12/1991 | Kostrzewski | 277/320 |
| 5,173,015 A * | 12/1992 | Maynard | 408/137 |
| 5,297,907 A | 3/1994 | Strait et al. | |
| 5,323,962 A | 6/1994 | Jassby et al. | |
| 5,348,429 A * | 9/1994 | Pfister | 408/129 |
| 5,352,069 A * | 10/1994 | Rourke | 408/1 R |
| 5,383,751 A * | 1/1995 | Wheetley et al. | 408/1 R |
| 5,390,557 A | 2/1995 | Tsukada | |
| 5,395,187 A | 3/1995 | Slesinski et al. | |
| 5,403,133 A | 4/1995 | Kim | |
| 5,445,478 A * | 8/1995 | Ordogh et al. | 408/1 R |
| 5,468,099 A | 11/1995 | Wheetley et al. | |
| 5,477,597 A | 12/1995 | Catania et al. | |
| 5,482,411 A | 1/1996 | McGlasson | |
| 5,537,927 A | 7/1996 | Rogovein et al. | |
| 5,542,796 A | 8/1996 | Bratten et al. | |
| 5,573,076 A | 11/1996 | McCannon, Jr. | |
| 5,582,067 A | 12/1996 | Snider | |
| 5,609,444 A | 3/1997 | Valsecchi | |
| 5,613,810 A * | 3/1997 | Bureller | 408/3 |
| 5,661,892 A | 9/1997 | Catania et al. | |
| 5,664,311 A | 9/1997 | Banks et al. | |
| 5,697,413 A | 12/1997 | Fuller | |
| 5,934,848 A | 8/1999 | Hamalainen | |
| 6,007,278 A * | 12/1999 | Arsenault | 408/79 |
| 6,036,409 A | 3/2000 | Rissler | |
| 6,073,326 A | 6/2000 | Banks et al. | |
| 6,099,213 A * | 8/2000 | Kammeraad et al. | 408/14 |
| 6,210,084 B1 | 4/2001 | Banks et al. | |
| 6,220,099 B1 | 4/2001 | Marti et al. | |
| 6,240,332 B1 | 5/2001 | Buttrick et al. | |
| 6,283,684 B1 | 9/2001 | Jarvis | |
| 6,309,145 B1 * | 10/2001 | Tremblay et al. | 408/1 R |
| 6,334,745 B1 | 1/2002 | Bennett, Sr. | |
| 6,357,101 B1 | 3/2002 | Sarh et al. | |
| 6,378,197 B1 | 4/2002 | Hansen | |
| 6,382,889 B1 * | 5/2002 | Brown et al. | 409/175 |
| 6,413,022 B1 | 7/2002 | Sarh | |
| 6,428,452 B1 | 8/2002 | Dahlstrom et al. | |
| 6,428,453 B1 | 8/2002 | Hoppe et al. | |
| 6,430,796 B1 | 8/2002 | Jones et al. | |
| 6,439,813 B1 | 8/2002 | Repossini | |
| 6,467,385 B1 | 10/2002 | Buttrick et al. | |
| 6,494,307 B1 | 12/2002 | Kozak et al. | |
| 6,505,393 B2 | 1/2003 | Stoewer et al. | |
| 6,547,496 B2 * | 4/2003 | Chun et al. | 408/124 |
| 6,550,129 B1 | 4/2003 | Buttrick, Jr. | |
| 6,575,673 B2 * | 6/2003 | Born | 408/97 |
| 6,612,792 B2 | 9/2003 | Barclay | |
| 6,634,838 B2 | 10/2003 | Kitamura et al. | |
| 6,796,014 B2 | 9/2004 | Sarh | |
| 6,843,328 B2 * | 1/2005 | Boyl-Davis et al. | 173/32 |
| 6,855,099 B2 | 2/2005 | Hazlehurst et al. | |
| 6,902,362 B2 | 6/2005 | Ferrari et al. | |
| 6,926,094 B2 * | 8/2005 | Arntson et al. | 173/32 |
| 2002/0001511 A1 | 1/2002 | Reguzzi | |
| 2002/0127069 A1 | 9/2002 | Luigi | |
| 2002/0168241 A1 | 11/2002 | David et al. | |
| 2003/0207742 A1 | 11/2003 | Hazlehurst et al. | |
| 2004/0076484 A1 | 4/2004 | Alam et al. | |
| 2004/0234352 A1 | 11/2004 | Vanderpol et al. | |
| 2004/0245879 A1 * | 12/2004 | Hirzel et al. | 310/156.01 |
| 2005/0158134 A1 | 7/2005 | Roders | |

FOREIGN PATENT DOCUMENTS

| | | |
|---|---|---|
| JP | 55-120910 | 9/1980 |
| JP | 58-028442 | 2/1983 |
| JP | 58028442 A * | 2/1983 |
| JP | 64-064711 | 3/1989 |
| JP | 401064711 | 3/1989 |
| JP | 01-210207 | 8/1989 |
| JP | 05-318215 | 12/1993 |
| JP | 05-318218 | 12/1993 |

* cited by examiner

APPARATUS AND METHODS FOR SERVO-CONTROLLED MANUFACTURING OPERATIONS

BACKGROUND OF THE INVENTION

The fabrication of large structures may involve the performance of a large number of manufacturing operations on the structure, such as the drilling of a large number of holes. Conventional structures that require a large number of manufacturing operations include, for example, aircraft, missiles, ships, railcars, sheet metal buildings, and other similar structures. In particular, conventional aircraft fabrication processes typically involve the drilling of a large number of holes in wing sections of the aircraft to allow these sections to be attached to each other and to the airframe.

A variety of devices have been developed to facilitate drilling operations involving the drilling of a large number of holes. For example, U.S. Pat. No. 4,850,763 issued to Jack et al. discloses a drilling system that includes a pair of rails temporarily attached to an aircraft fuselage. A support carriage is slideably coupled to the rails and supports a drill assembly. A template attached to the aircraft fuselage provides an indication of the desired locations of the holes that are to be formed in the aircraft fuselage. As the carriage is moved along the rails, a locking mechanism (or trigger) interacts with the template to securely position the carriage for a subsequent drilling operation.

Although desirable results have been achieved using such prior art systems, there may be room for improvement. For example, prior art manufacturing tools may be undesirably heavy, particularly pneumatically-driven tools and other tools assembled from conventional components having individual housings and support bearings. Furthermore, at least some conventional pneumatically-driven tools do not provide precise controllability for performing manufacturing operations. Some pneumatic drill assemblies, for example, do not allow precise control of drill feed rate or rotational speed. Therefore, a need exists for an improved manufacturing apparatus that reduces weight and provides improved controllability for performing manufacturing operations on a workpiece.

SUMMARY OF THE INVENTION

The present invention is directed to apparatus and methods for servo-controlled track drilling operations. Apparatus and methods in accordance with the present invention may advantageously improve the accuracy, efficiency, and throughput of manufacturing operations on a workpiece.

In one embodiment, an apparatus for performing a manufacturing operation on a workpiece includes a base member, a drive platform spaced apart from the base member by a separation distance, and a plurality of guide members extending between the drive platform and the base member. At least one of the drive platform and the base member are moveable along the guide members to increase or decrease the separation distance. The apparatus also includes a drive member operatively coupled between the drive platform and the base member, and a servo motor operatively coupled to the drive member. As the servo motor drives the drive member, the separation distance is varied. In an alternate embodiment, a manufacturing tool may be coupled to at least one of the drive platform and the base member, and as the motor drives the drive member, the manufacturing tool is engaged with the workpiece.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to apparatus and methods for servo-controlled manufacturing operations, and more specifically, to servo-controlled track drilling operations. Many specific details of certain embodiments of the invention are set forth in the following description and in FIGS. 1-6 to provide a thorough understanding of such embodiments. One skilled in the art, however, will understand that the present invention may have additional embodiments, or that the present invention may be practiced without several of the details described in the following description.

Figure 1:
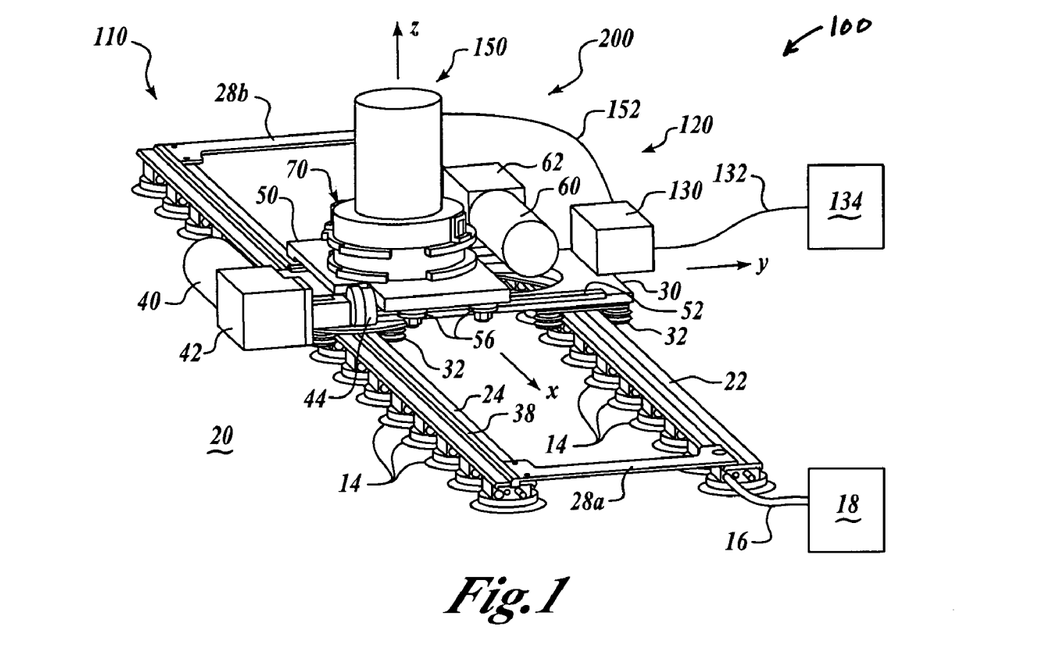
FIG. 1 is an upper isometric view of a manufacturing assembly having a servo-controlled tool assembly in accordance with an embodiment of the invention.

FIG. 1 is an upper isometric view of a manufacturing assembly 100 having a servo-controlled tool assembly 150 in accordance with an embodiment of the invention. In this embodiment, the manufacturing assembly 100 includes a track assembly 110 controllably attachable to a workpiece 20, and a carriage assembly 120 moveably coupled to the track assembly 110. A controller 130 is mounted on the carriage assembly and is operatively coupled to the servo-controlled tool assembly 150 and to the carriage assembly 120. As described more fully below, the manufacturing assembly 100 having the servo-controlled tool assembly 150 may advantageously improve the accuracy and efficiency of manufacturing operations performed on the workpiece 20.

As further shown in FIG. 1, in this embodiment, the track assembly 110 includes first and second flexible rails 22, 24, each rail 22, 24 being equipped with a plurality of vacuum cup assemblies 14. The vacuum cup assemblies 14 are fluidly coupled to one or more vacuum lines 16 leading to a vacuum source 18, such as a vacuum pump or the like, such that vacuum may be controllably applied to the vacuum cup assemblies 14 to secure the track assembly 110 to a workpiece 20. The vacuum cup assemblies 14 are of known construction and may be of the type disclosed, for example, in U.S. Pat. No. 6,467,385 B1 issued to Buttrick et al., or U.S. Pat. No. 6,210,084 B1 issued to Banks et al. In alternate embodiments, the vacuum cup assemblies 14 may be replaced with other types of attachment assemblies, including magnetic attachment assemblies, bolts or other threaded attachment members, or any other suitable attachment assemblies.

The rails 22, 24 preferably have a width substantially greater than their thickness such that they are substantially stiffer in bending about an axis that extends in the thickness direction (parallel to the z-axis in FIG. 1) than they are about an axis that extends in the width direction (parallel to the y-axis in FIG. 1). The rails 22, 24 are oriented approximately parallel to each other, although the lateral spacing between the rails 22, 24 can vary when the rails 22, 24 are mounted on a compound-contoured workpiece surface. Preferably, the rails 22, 24 are rigidly affixed to each other at only one end by a connecting member 28a, which fixes the lateral spacing between the rails at that end. At other locations along the rails 22, 24, the spacing between the rails 22, 24 can vary as noted. There can be another connecting member 28b at the opposite end of the rails 22, 24, but this connecting member 28b may provide a "floating" connection that allows the spacing between the rails 22, 24 to adjust as needed depending on the contour of the workpiece 20 surface.

The widths of the rails 22, 24 extend substantially parallel to the surface of the workpiece 20 when the vacuum cup assemblies 14 are attached to the workpiece 20. Because the rails 22, 24 may bend relatively easily about the widthwise directions and to twist about their longitudinal axes, the rails 22, 24 may flex and twist as needed to substantially follow the surface of the workpiece 20 and the vacuum cup assemblies 14 maintain each rail at a substantially constant distance from the surface of the workpiece 20. In this manner, the major surfaces of the rails 22, 24 may be substantially perpendicular to the surface normal of the workpiece 20 at any point along each rail.

Figure 2:
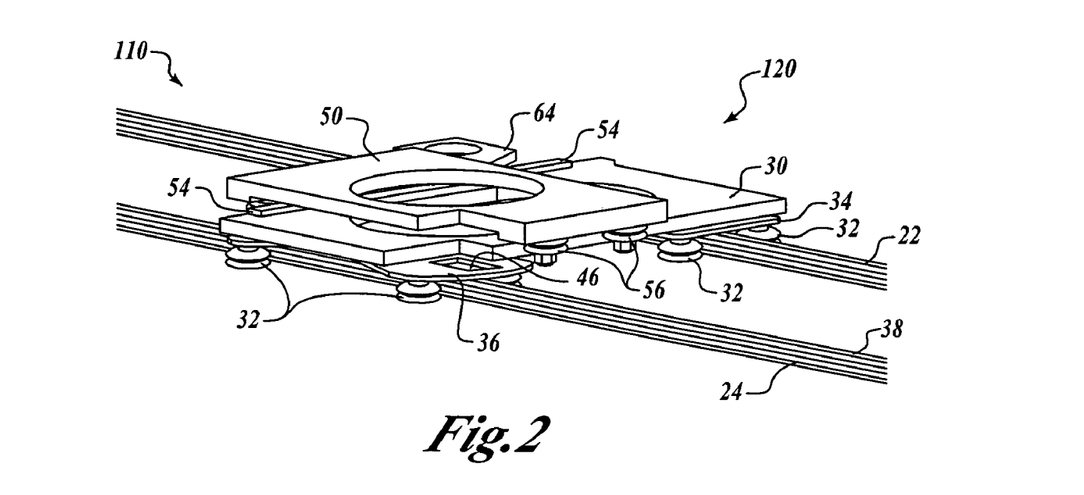
FIG. 2 is an enlarged, partial isometric view of a track assembly and a carriage assembly of the manufacturing assembly of FIG. 1.
Figure 3:
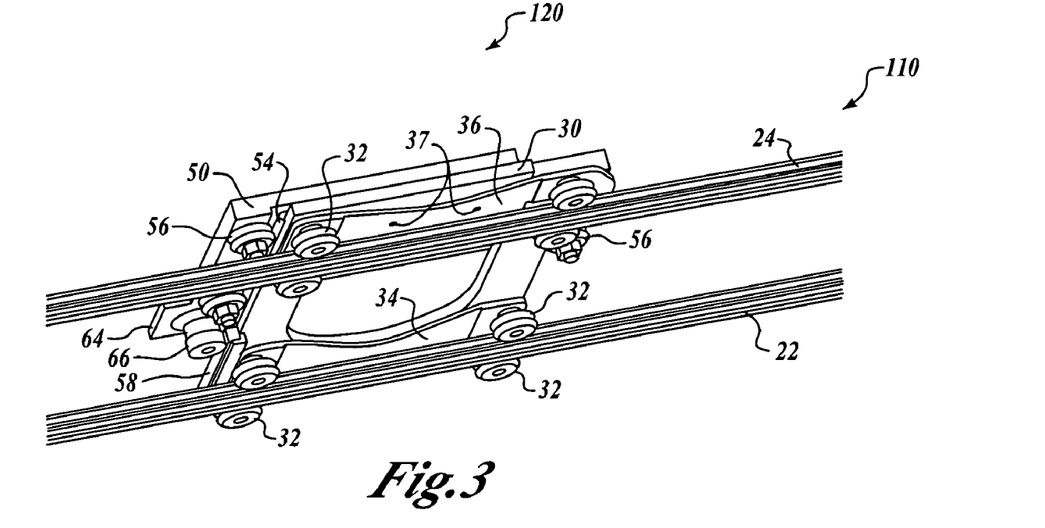
FIG. 3 is a lower, partial isometric view of the track and carriage assemblies of FIG. 2.

FIGS. 2 and 3 are enlarged, partial upper and lower isometric views, respectively, of a track assembly 110 and a carriage assembly 120 of the manufacturing assembly 100 of FIG. 1. As best shown in FIG. 2, the carriage assembly 120 may translate along the rails 22, 24 by virtue of rollers 32 that are mounted on an x-axis carriage 30 of the carriage assembly 120 and engaged with the rails 22, 24. The x-axis carriage 30 of the carriage assembly 120 in the illustrated embodiment comprises a plate-shaped member. The rollers 32 are mounted along each of the opposite side edges of the x-axis carriage 30. More particularly, spring plates 34 and 36 (best shown in FIG. 3) are attached to the x-axis carriage 30 adjacent to a lower surface thereof at each of the opposite side edges of the x-axis carriage 30. The spring plates 34, 36 are affixed to the x-axis carriage 30 at locations 37 (FIG. 3) spaced inwardly from the opposite ends of the spring plates 34, 36, such that each spring plate has two opposite end portions that are cantilevered from the x-axis carriage 30. The rollers 32 are mounted on these cantilevered end portions of the spring plates 34, 36. There are two opposing rollers 32 mounted on each cantilevered end portion of each of the spring plates 34, 36. Each rail 22, 24 is received between the opposing rollers 32. The rails 22, 24 preferably have V-shaped edges engaged by the rollers 32, and the rollers 32 are V-groove rollers having V-shaped grooves that receive the V-shaped edges of the rails 22, 24. The rollers 32 thus prevent relative movement between the rollers 32 and rails 22, 24 in the direction along the rotational axes of the rollers 32, which axes are substantially normal to the workpiece 20.

The spring plates 34, 36 on which the rollers 32 are mounted may flex and twist as needed (i.e. as dictated by the contour of the workpiece 20 as the carriage assembly 120 traverses the rails 22, 24) to allow a limited degree of relative movement to occur between the x-axis carriage 30 and the rollers 32. This is facilitated by making the spring plates 34, 36 relatively narrow at their middles and wider at their ends, so that the plates 34, 36 preferentially bend and twist at approximately the middle rather than at the ends where the rollers 32 are mounted. Thus, a limited degree of relative movement can occur between the x-axis carriage 30 and the rails 22, 24. The net result is that the x-axis carriage 30 enables the carriage assembly 120 to traverse the rails 22, 24 along the x-axis (i.e. the axis parallel to the length direction of the rails 22, 24) even though the rails 22, 24 may be bending and twisting in somewhat different ways relative to each other. In effect, the rails 22, 24 conform to the contour of the workpiece 20 and thus, the thickness direction of the rails 22, 24 is approximately normal to the surface of the workpiece 20 at any point along the path defined by the rails 22, 24. Consequently, a reference axis of the carriage assembly 120 (in the illustrated embodiment, a z-axis normal to the plane of the x-axis carriage 30) is maintained substantially normal to the workpiece 20 at any position of the carriage assembly 120 along the rails 22, 24.

As best shown in FIGS. 1 and 2, a rack 38 for a rack and pinion arrangement is mounted along the surface of the rail 24 that faces the spring plate 36, and the carriage assembly 120 includes a first motor 40 and associated gearbox 42 mounted on the spring plate 36. An output shaft from the gearbox 42 has a pinion gear 44 mounted thereon, and the spring plate 36 includes a window 46 (FIG. 2) that the pinion gear 44 extends through to engage the rack 38 on the rail 24. Thus, rotation of the pinion gear 44 by the first motor 40 drives the carriage assembly 120 along the rails 22, 24. It may be appreciated that the rail 24 having the rack 38 comprises a reference rail relative to which the x-axis positioning of the carriage assembly 120 may be performed. No attempt is necessary to determine or control the x-axis positioning of the carriage assembly 120 relative to the other rail 22.

To improve accuracy of the x-axis position of the carriage assembly 120, the pinion gear 44 may have a constant height relative to the rack 38 at any point along the reference rail 24. To accomplish this height control, the rotation axis of the pinion gear 44 may preferably lie in the same plane as that defined by the rotational axes of the two rollers 32 mounted on the end of the spring plate 36. More particularly, the axes of the rollers 32 may be substantially parallel to each other and substantially normal to the workpiece surface 102, and the axis of the pinion gear 44 may be substantially parallel to the workpiece surface 102 and may lie in the plane of the roller axes.

As further shown in FIGS. 1-3, the carriage assembly 120 further includes a y-axis carriage 50 slideably mounted atop the x-axis carriage 30 so that the y-axis carriage 50 can slide back and forth along a y-axis direction perpendicular to the x-axis direction. More particularly, rails 52, 54 are affixed to the opposite edges of the x-axis carriage 30, and rollers 56 are mounted on the y-axis carriage 50 for engaging the rails 52, 54. A rack 58 for a rack and pinion arrangement is affixed to the x-axis carriage 30 along the edge thereof adjacent to the rail 54 (see FIG. 3). A second motor 60 and associated second gearbox 62 are mounted on a plate 64 that is affixed to the y-axis carriage 50 adjacent to the rack 58. The plate 64 includes a window therethrough, and the output shaft of the second gearbox 62 extends through the window and drives a pinion gear 66 that engages the rack 58. Thus, rotation of the pinion gear 66 by the second motor 60 drives the second base member along the rails 52, 54 in the y-axis direction.

In operation, the manufacturing assembly 100 may be mounted onto the workpiece 20 and vacuum may be provided to the vacuum assemblies 14, thereby securing the track assembly 110 to the workpiece 20 in a desired position. The carriage assembly 120 may then be moved to a desired position along the track assembly 110. The controller 130 may transmit control signals to the first drive motor 40, rotating the first drive gear 44 which engages with the rack 38 to drive the carriage assembly 120 along the track assembly 110. Similarly, the controller 130 may transmit control signals to the second drive motor 60 to adjust the position of the y-axis carriage 50 relative to the x-axis carriage 30. Additional operations of the manufacturing assembly 100 are described below.

As further shown in FIG. 1, mounted atop the y-axis carriage 50 is a clamp ring assembly 70. The clamp ring assembly 70 supports and secures the servo-controlled tool assembly 150. The tool assembly 150 may be extended through a window in the y-axis carriage 50 (visible in FIG. 2), and through a window in the x-axis carriage 30 (visible in FIG. 3) that is elongated in the y-axis direction. The axis of the tool assembly 150 may be approximately parallel to the z-axis, and thus may be substantially normal to the workpiece 20. The tool assembly 150 may be coupled to the controller 130 via a command link 152 for controlling manufacturing operations on the workpiece 20.

It may be appreciated that the various operations of the manufacturing assembly 100 may be controlled by the controller 130, including the positioning of the carriage assembly 120 on the track assembly 110, and the positioning and engagement of the servo-controlled tool assembly 150 with respect to the workpiece 20. These operations may be accomplished in an automated or semi-automated manner using the controller 134 equipped with computerized numerically-controlled (CNC) methods and algorithms. Alternately, the positioning may be performed manually or partially-manually by an operator, such as, for example, by having the operator provide manual control inputs to the controller 134, or by temporarily disabling or neutralizing the above-referenced motors and actuators of the carriage assembly 120 to permit manual movement.

In a particular aspect, the controller 130 includes an entire CNC control system. For example, in one particular embodiment, the controller 130 includes an 8-axis servo-controller, and a plurality of servo-amplifiers, servo-motors, and air solenoids. Because the controller 130 is attached directly to the carriage assembly 120 (e.g. to the y-axis carriage 50), the controller 130 travels with the carriage assembly 120 during the performance manufacturing operations. Thus, the links or cables between the controller 130 and the other components of the manufacturing assembly 100 for transmitting control signals to (and receiving feedback signals from) the drive motors 40, 60 of the carriage assembly 120, the tool assembly 150, and any other components of the manufacturing assembly, are greatly reduced or eliminated. A controller umbilical 132 (FIG. 1) may provide control air, electrical power, and communication cables from a supply unit 134 to the controller 130.

Figure 4:
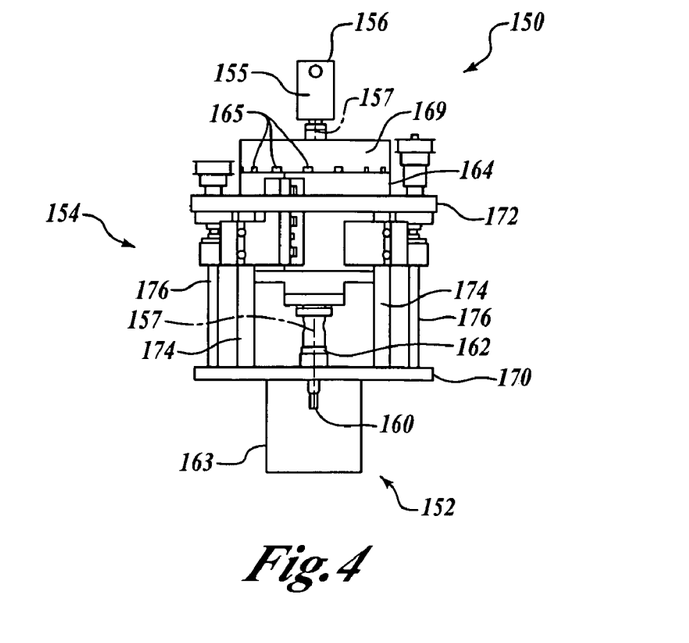
FIG. 4 is an enlarged, front elevational view of a servo-controlled tool assembly of the manufacturing assembly of FIG. 1.
Figure 5:
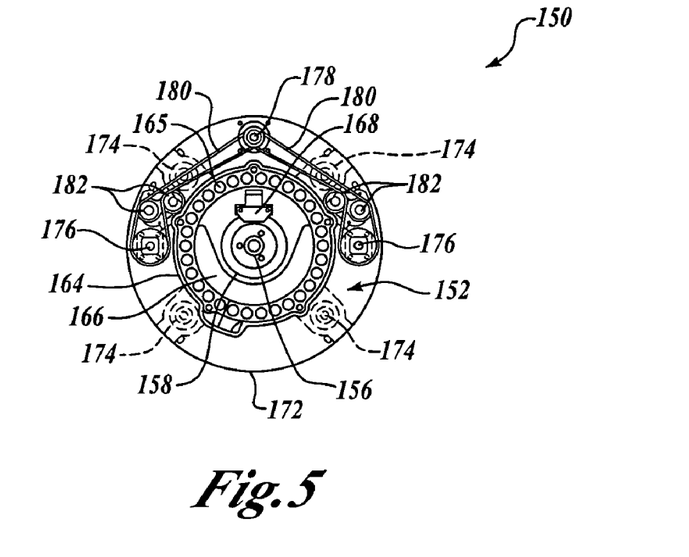
FIG. 5 is a partially-exposed top elevational view of the servo-controlled tool assembly of FIG. 4.
Figure 6:
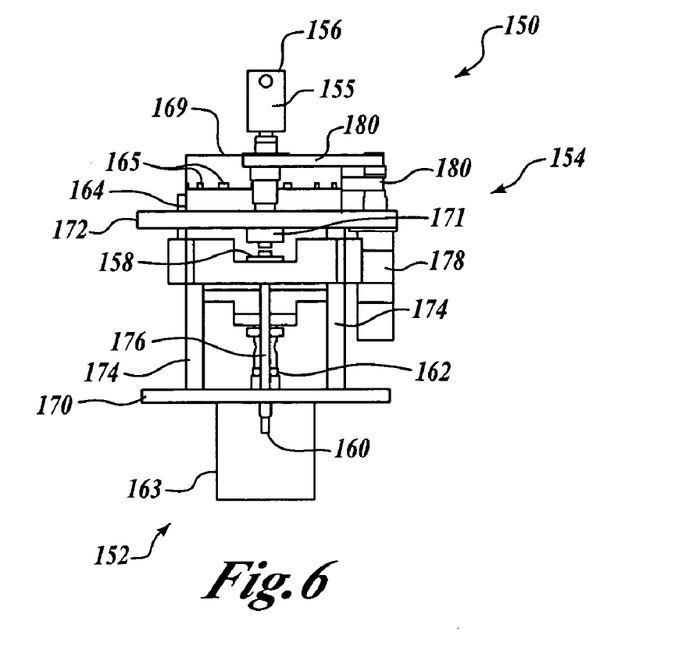
FIG. 6 is a side elevational view of the servo-controlled tool assembly of FIG. 4.

FIG. 4 is an enlarged, front elevational view of the servo-controlled tool assembly 150 of the manufacturing assembly 100 of FIG. 1. FIGS. 5 and 6 are exposed top and side elevational views, respectively, of the servo-controlled tool assembly 150 of FIG. 4. In this embodiment, the tool assembly 150 includes a drill spindle module 152 and a drive unit (or feed unit) 154. The drill spindle module 152 includes a centrally-disposed motor shaft 156 having armature windings 158 (FIG. 5) disposed thereon. The motor shaft 156 includes a drill holding collet 162 that holds a drill member 160 that may be engaged with the workpiece 20.

The motor shaft 156 further includes a lubrication reservoir 155 positioned at the upper end of the motor shaft 156 and a lubrication channel 157 (FIG. 4) extending longitudinally through the length of the motor shaft 156 from the lubrication reservoir 155 to the drill member 160 to enable lubricant to be applied through the shaft 156 to the drill member 160. A pilot bushing 163 extends downwardly about the drill member 160 and securely engages against the workpiece 20 during a manufacturing operation. A spindle motor housing 164 having a plurality of air cooling ports 165 is disposed about the motor shaft 156, and a field assembly 166 (FIG. 5) is positioned within the motor housing 164 and proximate to the armature windings 158 of the motor shaft 156. The field assembly 166 may include one or more rare earth permanent magnets that, in combination with the armature windings 158, provide a lightweight brushless motor. A top cover 169 (removed in the partially-exposed view in FIG. 5) covers the upper portion of the spindle motor housing 164. As further shown in FIG. 5, a drill speed encoder 168 is mounted on the motor shaft 156.

With continued reference to FIGS. 4-6, the drive unit 154 of the tool assembly 150 includes a base member 170 slideably coupled to a drive platform 172 by four circumferentially-spaced guide rods 174. In this embodiment, the drive platform 172 is coupled to the drill spindle module 152 while the base member 170 is coupled to the carriage assembly 120. The motor shaft 156 of the drill spindle module 152 is rotatably mounted through the base member 170 and the drive platform 172 by a rotary bearing 171. Although the motor housing 164 (and field assembly 166) are shown in the accompanying figures as being coupled to the drive platform 172, in alternate embodiments, the motor housing 164 may be coupled to the base member 170, or to both the base member and the drive platform 172.

As best shown in FIG. 4, the drive unit (or feed unit) 154 includes two ball screws 176 that extend between the base member 170 and the drive platform 172. A servo motor 178 is mounted to the drive platform 172 and is coupled to each of the ball screws 176 by a drive belt 180 (FIG. 6). As shown in FIG. 5, the drive belts 180 are engaged over a plurality of belt tensioners 182 that help to maintain positive engagement of the drive belts 180 with the ball screws 176. The servo motor 178 and the drill spindle module 152, including the drill speed encoder 168, are operatively coupled to the controller 130.

In operation, the carriage assembly 120 is positioned in a desired location over the workpiece 20 in the manner described above. The drive unit 154 of the tool assembly 150 may then be activated by the controller 130, causing the servo motor 178 to drive the ball screws 176, propelling the drive platform 172 toward the base member 170, and thus, driving the drill spindle module 152 toward the workpiece 20 and engaging the pilot bushing 163 with the workpiece 20. Similarly, the drill spindle module 152 may be activated to ready the drill member 160 for engagement with the workpiece 20. As the drive unit 154 continues to drive the drive platform 172 toward the base member 170, the drill member 160 is driven into the workpiece 20, performing the desired manufacturing operation on the workpiece 20. After the manufacturing operation is performed, the controller 130 may transmit appropriate control signals to the servo motor 178 to rotate the ball screws 176 in the opposite direction, thereby drawing the drive platform 172 away from the base member 170 and withdrawing the drill spindle module 152 from the workpiece 20. The carriage assembly 120 may then be repositioned at a new location, and the process repeated as desired.

Manufacturing assemblies having servo-controlled tool assemblies in accordance with the teachings of the present invention may advantageously improve the quality and efficiency of manufacturing operations on a workpiece. For example, the servo-controlled tool assembly 150 in accordance with the present invention provides an extremely lightweight manufacturing apparatus. Specifically, because the tool assembly 150 combines a field assembly 166 that may include one or more rare earth magnets with the armature windings 158 on the motor shaft 156 to provide a brushless motor, the tool assembly 150 may be considerably lighter than prior art, pneumatically-driven tool assemblies. Additional weight savings are achieved by providing the motor shaft 156 that incorporates the drill holding collet 162, and that includes the internal lubricant channel 157. Furthermore, all of the components of the drill spindle module 152, including the frameless motor, are provided on one shaft and share one set of rotary bearings. Thus, servo-controlled tool assemblies in accordance with the teachings of the present invention may be substantially lighter than prior art tool assemblies, providing improved controllability and accuracy during manufacturing operations. Also, because the tool assemblies are more lightweight, the setup and tear-down of the manufacturing assembly 100 may be simplified, and the efficiency and throughput of the manufacturing operations may be improved.

Furthermore, because the feed rate of the drive unit 154 may be precisely controlled via the servo motor 178, the servo-controlled tool assembly 150 may provide improved performance over prior art tool assemblies. For example, by monitoring the rotational speed of the motor shaft 156 via the speed encoder 168, the controller 130 may transmit appropriate control signals to the servo motor 178 (or to the drill spindle module 152) to provide a desired relationship between the rotational speed of the shaft and the feed rate of the drill spindle module 152. In one embodiment, for example, the controller 130 may carefully control the feed rate and/or the rotational speed of the drill spindle module 152 to provide a maximum drilling rate into the workpiece. Alternately, the controller 130 may control the tool assembly to maintain a desired workload on the drill spindle module 152, or to provide the highest quality drilling operation. The enhanced controllability of the servo-controlled tool assembly 150 may be particularly effective in cases where the physical characteristics of the workpiece 20 are variable, such as for a workpiece 20 that includes a plurality of layers of different materials having differing hardness values. In this case, the controller 10 may quickly and efficiently adjust the feed rate provided by the servo motor 178 to maintain the desired drilling speed of the drill spindle module 152. Thus, using servo-controlled tool assemblies in accordance with the present invention, both the drill speed and the feed rate may be precisely controlled to provide optimal performance and to improve manufacturing throughput.

It may be appreciated that a variety of alternate embodiments of apparatus and methods may be conceived in accordance with the present invention, and that the invention is not limited to the particular apparatus and methods described above and shown in the accompanying figures. For example, it may be noted that the carriage assembly 120 and the track assembly 110 may assume a wide variety of alternate embodiments, including, for example, the rail and carriage assemblies taught by U.S. Pat. No. 4,850,763 issued to Jack et al, and any of the carriage assemblies and track assemblies disclosed in co-pending, commonly owned U.S. patent application Ser. No. 10/016,524, which application is incorporated herein by reference.

It may also be noted that in alternate embodiments, the drill spindle module 152 may be replaced with a wide variety of manufacturing tools to perform any desired manufacturing operation on the workpiece 20. In alternate embodiments, for example, the drill spindle module 152 may be replaced with one or more riveters, mechanical and electromagnetic dent pullers, welders, wrenches, clamps, sanders, nailers, screw guns, routers, degreasers, washers, etchers, deburring tools, lasers, tape applicators, or virtually any other desired type of manufacturing tools or measuring instruments.

Thus, while specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

What is claimed is:

1. An apparatus for performing a manufacturing operation on a workpiece, the apparatus comprising:
   a base member having a first aperture disposed therethrough;
   a drive platform having a second aperture disposed therethrough, the drive platform being spaced apart from the base member by a separation distance and aligned with the base member such that the first and second apertures are approximately aligned along an axis;
   a plurality of guide members extending between the drive platform and the base member, at least one of the drive platform and the base member being moveable along the guide members to at least one of increase and decrease the separation distance;
   at least one drive member operatively coupled between the drive platform and the base member, wherein the plurality of guide members and the at least one drive member are distributed around a perimeter of the first and second apertures; and
   a servo motor operatively coupled to the at least one drive member by a feed unit that includes at least one drive belt operatively coupled between an output shaft of the servo motor and the at least one drive member such that as the servo motor drives the at least one drive member, the separation distance is varied.

2. The apparatus of claim 1, wherein the at least one drive member includes first and second drive members and wherein the at least one drive belt includes a first drive belt operatively coupled between the output shaft and the first drive member, and a second drive belt operatively coupled between the output shaft and the second drive member.

3. The apparatus of claim 2, wherein the first and second drive members are positioned on opposing sides of the first and second apertures.

4. The apparatus of claim 2, wherein the drive platform includes a first annular portion and the base member includes a second annular portion, the first and second annular portions being aligned along an axis and the plurality of guide members and the at least one drive member being concentrically spaced about the first and second annular portions, and wherein the tool assembly extends through the first and second annular portions along the axis.

5. The apparatus of claim 4, wherein the tool assembly includes:
   a motor shaft extending along the axis and rotatably coupled to at least one of the drive platform and the base member;
   an armature winding disposed about at least a portion of the motor shaft; and a field assembly coupled to at least one of the drive platform and the base member and positioned proximate the armature winding.

6. The apparatus of claim 5, further including:
a controller operatively coupled to the servo motor; and
a speed sensor operatively coupled to the motor shaft and to the controller, the controller being adapted to receive a feedback signal from the speed sensor and to transmit a control signal to the servo motor.

7. The apparatus of claim 5, wherein the motor shaft includes a lubrication reservoir coupled at a first end thereof and a lubrication channel longitudinally extending internally therethrough.

8. The apparatus of claim 1, further comprising a tool assembly that includes:
a motor shaft extending along the axis and rotatably coupled to the drive platform;
an armature winding disposed about at least a portion of the motor shaft; and
a field assembly coupled to at least one of the drive platform and the base member and positioned proximate the armature winding.

9. The apparatus of claim 8, wherein the motor shaft includes a drill collet adapted to secure a drill member.

10. The apparatus of claim 8, further including:
a controller operatively coupled to the servo motor; and
a speed sensor operatively coupled to the motor shaft and to the controller, the controller being adapted to receive a feedback signal from the speed sensor and to transmit a control signal to the servo motor.

11. The apparatus of claim 8, wherein the motor shaft includes a lubrication reservoir coupled at a first end thereof and a lubrication channel longitudinally extending internally therethrough.

12. The apparatus of claim 1, wherein the at least one drive member includes a ball screw.

13. An apparatus for performing a manufacturing operation on a workpiece, the apparatus comprising:
a track assembly configured to be attached to the workpiece;
a carriage assembly moveably coupled to the track assembly and moveable relative to the workpiece; and
a tool feed unit coupled to the carriage assembly and configured to be coupled to a tool assembly and to controllably engage the tool assembly with the workpiece, the tool feed unit including:
a base member having a first aperture disposed therethrough;
a drive platform having a second aperture disposed therethrough, the drive platform being spaced apart from the base member by a separation distance and aligned with the base member such that the first and second apertures are approximately aligned along an axis;
a plurality of guide members extending between the drive platform and the base member, at least one of the drive platform and the base member being moveable along the guide members to at least one of increase and decrease the separation distance;
at least one drive member operatively coupled between the drive platform and the base member, wherein the plurality of guide members and the at least one drive member are distributed around a perimeter of the first and second apertures; and
a servo motor operatively coupled to the at least one drive member such that as the servo motor drives the at least one drive member, the separation distance is varied.

14. The apparatus of claim 13, wherein the at least one drive member includes first and second drive members and wherein the servo motor includes an output shaft, the apparatus further comprising a first drive belt operatively coupled between the output shaft and the first drive member, and a second drive belt operatively coupled between the output shaft and the second drive member.

15. The apparatus of claim 14, wherein the first and second drive members are positioned on opposing sides of the first and second apertures.

16. The apparatus of claim 13, further including a tool assembly coupled to the tool feed unit and configured to be engaged with the workpiece, wherein the tool assembly includes:
a motor shaft extending along the axis and rotatably coupled to the drive platform;
an armature winding disposed about at least a portion of the motor shaft; and
a field assembly coupled to at least one of the drive platform and the base member and positioned proximate the armature winding.

17. The apparatus of claim 16, further including:
a controller operatively coupled to the servo motor; and
a speed sensor operatively coupled to the motor shaft and to the controller, the controller being adapted to receive a feedback signal from the speed sensor and to transmit a control signal to the servo motor.

18. The apparatus of claim 13, further comprising a tool assembly that includes:
a motor shaft extending along the axis and rotatably coupled to the drive platform;
an armature winding disposed about at least a portion of the motor shaft; and
a field assembly coupled to at least one of the drive platform and the base member and positioned proximate the armature winding.

19. The apparatus of claim 18, further including:
a controller operatively coupled to the servo motor; and
a speed sensor operatively coupled to the motor shaft and to the controller, the controller being adapted to receive a feedback signal from the speed sensor and to transmit a control signal to the servo motor.

20. The apparatus of claim 13, further comprising a controller mounted on the carriage assembly and operatively coupled to the servo motor of the tool feed unit, and wherein the carriage assembly includes a drive assembly operable to translate the carriage assembly along the track assembly, the drive assembly being operatively coupled to the controller.

21. The apparatus of claim 13, wherein the track assembly includes:
first and second elongate flexible rails, the rails being spaced apart and approximately parallel to each other; and
a plurality of vacuum attachment devices connected to each rail and spaced at intervals there along for releasably attaching each rail to the surface of the workpiece by vacuum, with the widths of the rails extending substantially parallel to the surface of the workpiece, the rails bending and twisting as needed to substantially follow the surface of the workpiece.

22. The apparatus of claim 21, wherein each rail is relatively stiff in bending about a first bending axis and relatively flexible in bending about a second bending axis orthogonal to the first bending axis, and wherein each rail is mounted on the workpiece such that the first bending axis is substantially normal to the workpiece surface and the second bending axis is substantially parallel to the workpiece surface.

23. A method of performing a manufacturing operation on a workpiece, the method comprising:

providing a tool feed unit having a base member moveably coupled to a drive platform by a plurality of guide members, the base member defining a first aperture and the drive platform defining a second aperture approximately aligned with the first aperture along an axis, at least one of the drive platform and the base member being moveable along the guide members to increase or decrease a separation distance therebetween, the tool feed unit including at least one drive member operatively coupled between the drive platform and the base member, and a servo motor operatively coupled to the at least one drive member, wherein the plurality of guide members and the at least one drive member are distributed around a perimeter of the first and second apertures;

operatively coupling a manufacturing tool to the tool feed unit; and controllably rotating the at least one drive member using the servo motor to vary separation distance between the drive platform and the base member and to engage the manufacturing tool with the workpiece, wherein controllably rotating the at least one drive member includes controllably rotating the at least one drive member using a drive belt operatively coupled between an output shaft of the servo motor and the at least one drive member.

24. The method of claim 23, further comprising moveably supporting the feed unit proximate a surface of the workpiece.

25. The method of claim 24 wherein moveably supporting the feed unit proximate a surface of the workpiece includes:

coupling a track assembly to the surface of the workpiece;

moveably coupling a carriage assembly to the track assembly; and coupling the tool feed unit to the carriage assembly.

26. The method of claim 25, wherein the coupling a track assembly to the surface of the workpiece includes applying vacuum to adhere the track assembly to the surface of the workpiece.

27. The method of claim 23, wherein controllably rotating the at least one drive member includes simultaneously rotating a first drive member using a first drive belt operatively coupled between an output shaft of the servo motor and the first drive member, and a second drive member using a second drive belt operatively coupled between the output shaft and the second drive member.

* * * * *